3,249,630
PREPARATION AND USE OF METAL-HALOGENO-ACETYLIDES
Heinz Gunter Viehe, Linkebeek, Belgium, assignor to Union Carbide Corporation, a corporation of New York
No Drawing. Filed Aug. 11, 1964, Ser. No. 388,941
21 Claims. (Cl. 260—429.7)

This application is a continuation-in-part of U.S. Serial No. 774,818 entitled "Process in the Preparation of Organo-Metallic Compounds" filed November 19, 1958 (and now abandoned) by H. G. Viehe and assigned to the same assignee as the instant invention.

This invention relates to novel organo-metallic compounds and to processes for their preparation. In one aspect, this invention relates to a novel class of metal-halogeno-acetylides which have a reactivity comparable to that of Grignard reagents. In a further aspect, this invention is directed to the process for the addition of a halogeno-acetylide to an organic compound containing polar or polarizable bonding.

The novel organo-metallic compounds of this invention can be conveniently represented by the following formula:

$$\text{Me}(\text{C}\equiv\text{C—X})_n Z_m$$

wherein Me represents an alkali or alkaline earth metal, i.e., lithium, potassium, sodium, rubidium, cesium, magnesium, calcium, barium, and strontium; —C≡C— represents an acetylenic group; X represents a halogen selected from the group consisting of chlorine, fluorine, and bromine; $n$ represents the number of (C≡C—X) groups combined with the metal and is a positive integer; Z is a member selected from the group consisting of alkyl, aryl, carbonyl, and nitrosyl; $m$ represents the number of Z groups combined with the metal; and the sum of $n$ and $m$ is equal to the total number of valences of the metal. Preferred metal-halogeno-acetylides encompassed by the aforementioned formula are those wherein Me represents an alkali metal, i.e., lithium, sodium, or potassium; X represents chlorine; $n$ represents 1, and $m$ has a value of zero.

Illustrative novel metal-halogeno-acetylides which can be prepared in accordance with the teachings of this invention include lithium chloroacetylide, sodium chloroacetylide, potassium chloroacetylide, lithium fluoroacetylide, sodium fluoroacetylide, potassium fluoroacetylide, and the like.

The metal-halogeno-acetylides of this invention are highly reactive and versatile compositions capable of entering into a wide variety of useful and economically attractive reactions. These novel compositions have a reactivity comparable to that of Grignard reagents and hence are particularly useful in those fields of application wherein it is desirable to add an acetylenic group onto an organic compound. For example, by utilizing the novel metal-halogeno-acetylides of this invention it is possible to add a chloroacetylenic side chain to a compound containing a polar group, e.g., carbonyl group. Thereafter, the addition of water in the presence of acids gives an alpha-chloroketol which is of interest in sugar and cortisone chemistry. Additionally, the compositions of this invention can also be utilized as reactive intermediates to produce numerous derivatives.

It is therefore an object of this invention to provide novel organo-metallic compounds, which have a reactivity comparable to that of Grignard reagents. Another object of this invention is to provide a novel class of metal-halogeno-acetylides. A further object is to provide a process for producing metal-halogeno-acetylides. Another object of this invention is to provide a process for producing metal-chloro-acetylides such as lithium-chloro-acetylide and sodium-chloro-acetylide. A further object of this invention is to provide a process for producing metal fluoro-acetylides such as lithium-fluoro-acetylide and sodium-fluoro-acetylide. Another object of this invention is to provide a process for producing metal-halogeno-acetylides by reacting a metal amide with a dihalogeno-ethylene. A further object of the invention is to provide a process for producing metal-halogeno-acetylides by reacting an organo-lithium with a dihalogeno-acetylene. Still another object of this invention is to provide a process in which a metal-halogeno-acetylide of a first metal is reacted with the halide of a second metal to produce the metal-halogeno-acetylide of the second metal. It is another object of the invention to provide new compositions of matter comprising metal-halogeno-acetylides. A further object of this invention is to provide a process utilizing a metal-halogeno-acetylide as an intermediary in which process it is unnecessary to isolate the metal-halogeno-acetylide. Another object is to provide a process for the addition of an acetylenic chain to any polar or polarizable bonding. A still further object of this invention is to provide a novel process for the addition of a chloro acetylenic chain to any polar or polarizable bonding which can then subsequently be converted into an alpha-chloro-keto group. These and other objects will readily become apparent to those skilled in the art in the light of the teachings herein set forth.

In its broad aspect, this invention is directed to novel metal-halogeno-acetylides of the aforementioned general formula and to processes for their preparation. Additionally, the invention encompasses the use of these novel compositions for the addition of an acetylenic side chain to a variety of polar or polarizable groups.

In one embodiment, the present invention encompasses metal-halogeno acetylides which can be represented by the formula:

$$\text{Me}(\text{C}\equiv\text{C—X})_n$$

wherein Me is a metal which normally forms unsubstituted or monosubstituted acetylides, —C≡C— is an acetylenic group, X is halogen and $n$ is a number indicating the proportion in which —(C≡C—X) is combined with the metal.

By a metal which forms normally unsubstituted or monosubstituted acetylides, is meant a metal of groups Ia and IIa of the periodic table. Suitable metals include the alkali metals and the earth alkali metals. The halogen of the novel acetylide compounds can be chlorine, bromine, or fluorine, of which chlorine and fluorine are preferred. The number $n$, which indicates the proportion in which —(C≡C—X) is combined with said metal, is equal to the usual valency of said metal when the acetylenic group is the only substituent.

In a second embodiment, the invention is directed to novel metal-halogeno-acetylides of the formula:

$$\text{Me}(\text{C}\equiv\text{C—X})_n Z_m$$

wherein Me, X and $n$ have the same value as previously indicated, and one valency, or more generally $m$ valences of the metal can be occupied by another substituent, e.g., by an organic group which does not interfere with the acetylenic group. The number $m$ is at most equal to $n-1$. Suitable organic groups include alkyl, aryl, carbonyl, nitroxyl, and the like.

It has been observed that an unexpected exchange reaction takes place when an organo-lithium, such as phenyl-lithium, is reacted with dichloroacetylene:

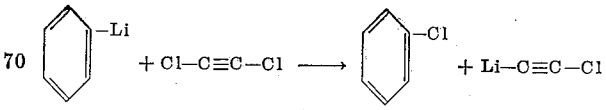

This reaction is performed in an organic solvent and proceeds quite easily even at low temperature. It is a convenient way of obtaining a highly reactive acetylide in situ which can be extensively used in further reactions. The temperature of this reaction is that at which the organic solvent used is in the liquid state. The reaction is preferably performed at room temperature and cooling is advisable since the reaction is slightly exothermic. It has been found that the reaction can successfully be performed even on cooling down the reaction vessel to the temperature of Dry Ice.

By suitable organic solvents, it is meant organic solvents which do not react with organo-metallic compounds, such as ethers, petroleum ethers, benzene, and the like. Conventionally used solvents such as diethyl ether, methyl ethyl ether, dioxane, tetrahydrofuran and the like are preferred in that they are currently available and known to be of general use in exchange reactions. Organo-lithium compounds found useful for the preparation of the compositions of the first embodiment of the invention include alkyl-lithium, alkenyl-lithium, and aryl-lithium.

Attempts to prepare sodium or calcium chloro-acetylides in a fashion similar to that discussed above were unsuccessful but it was found that such acetylides could be produced by reacting the metal amide with a dihalogeno-ethylene in liquid ammonia as follows:

(a) 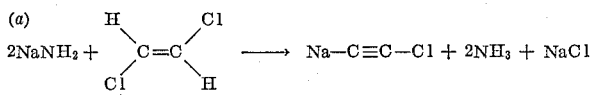

(b) 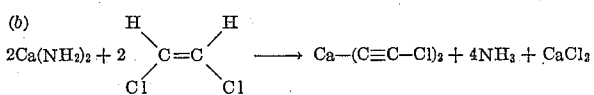

Any metal can be used which forms stable and reactive amides. Alkali metal amides and alkaline earth metal amides are quite suitable.

Ethylenic compounds which may be used include cis- and trans- unsubstituted or monosubstituted dihalogeno ethylenes such as dichloroethylene, dibromoethylene, fluorobromoethylene, phenyldichloroethylene, etc. Alkyl or aryl dihalogenoethylenic compounds in general may be used.

In practice, stoichiometric amounts of reactants are used for optimum results. The reaction is performed in liquid ammonia as solvent and the temperature is that at which ammonia exists in the liquid state. Under normal pressure, the temperature range extends from about $-80°$ C. to about $-30°$ C. It is apparent that the temperature range can be shifted toward $0°$ C. or about $0°$ C. by working under pressure, for instance by working in a sealed system. The reaction proceeds preferably with stirring and continues with or without cooling. The presence of water or moisture should be minimized to prevent hydrolysis of the acetylide product. Both the metal amide and the dihalogeno-ethylene are readily available and the product yield is usually well above 70 percent.

Metals which may be used in this embodiment of the invention include the alkali metals, i.e., lithium, sodium, potassium, rubidium, and cesium, and the alkaline earth metals, including calcium, barium, and strontium. Lithium, sodium, potassium, and calcium are preferred as their amides are readily available.

The novel acetylides of this invention have extremely good explosive properties. The heat of decomposition of lithium-chloro-acetylide is about 2 kilocalories per gram and for lithium-fluoro-acetylide as high as 3.6 kilocalories per gram. In comparison, nitroglycol has a heat of decomposition of 1.57 kilocalories per gram and TNT has one of 1.35 kilocalories per gram. Sodium-chloro-acetylide has a heat of decomposition of 1.3 kilocalories per gram. The acetylides can be isolated or safely kept in the solution in which they are produced or in an inert solvent such as ether or benzene. They can also be embedded in a paraffine material, a resin or a plastic to prevent direct contact with air and moisture.

As hereinbefore indicated the novel acetylides of this invention are useful in a variety of syntheses and in this respect are comparable in reactivity to Grignard reagents. The desired reactant need only be added to the solution in which the metal-halogeno-acetylide is produced and the final product is obtained without the necessity of isolating the acetylide. For instance, the novel acetylides are of particular interest in addition reactions wherein it is desired to add an acetylenic chain to any polar or polarizable bonding, in particular, double or triple bonds such as $>C=O$, $>C=C<$, $—C\equiv C—$,

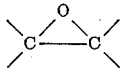

$>C=N—R$, $—C\equiv N$, and the like. A wide variety of organic compounds containing at least one of the aforesaid polar or polarizable groups as the site for addition of a halogeno-acetylide group can be employed. For instance, the addition reaction is applicable for adding a halogeno-acetylide group, e.g., a chloroacetylide group, to aliphatic, cycloaliphatic and aromatic compounds. Moreover, the addition reaction can be employed for the addition of the halogeno-acetylide group to fused ring systems, i.e., polycyclic aromatic compounds. The only requirement of the organic compound is that it be characterized by a polar or polarizable group capable of undergoing an addition reaction with the metal-halogeno-acetylide, and be free of groups which would adversely react the acetylide. Organic compounds which have been found particularly suitable are those composed of carbon, hydrogen, oxygen, and in some instances nitrogen and which contain from 3 to 25 carbon atoms. Particularly preferred are organic compounds which contain a carbonyl group as the sole reactive site at which addition occurs.

Illustrative addition reactions which can be effected with the metal-halogeno-acetylides of this invention include the addition of a chloroacetylide group to a cycloaliphatic compound, such as cyclohexanone to give the 1,1-chloroethynyl cyclohexanol:

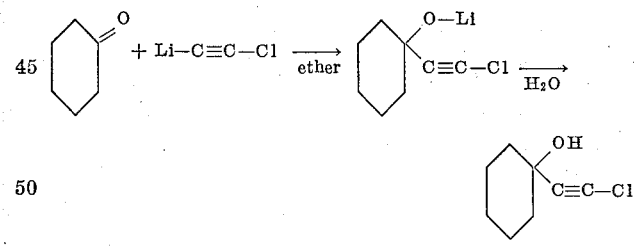

or the addition of a chloroacetylide group to an aliphatic compound such as in the preparation of chloro ethynyl propanol 2.2 from acetone:

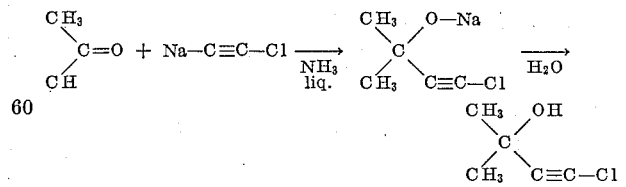

In both cases, the yield is higher than 80 percent and the reactants are simply added to the solution in which the metal-halogeno-acetylide is produced in situ without need for isolating the said acetylides.

The new acetylides can also be utilized in reaction of substitution not only with reactive metal halides as it has already been disclosed, but also with reactive metalloidohalides, such as those of silicium, carbon. For instance, one can prepare, in good yield, the silicium tetrachloro-acetylide from silicium tetrachloride

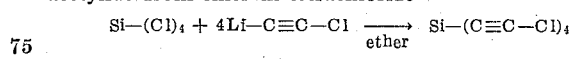

This silicium tetra-chloroacetylide so obtained is a crystalline product of melting point 115–117° C., the structure of which is confirmed both by analysis and infra-red spectroscopy. Similarly, the trimethylsilicium-monochloroacetylide is readily obtained from trimethylmonochlorosilicium

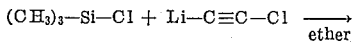

The reaction product is a liquid of boiling point 101.5° C. and refraction index $n_D^{22}=1.4330$ which is identified by analysis and infra-red spectroscopy as the trimethyl-silicium-monochloroacetylide; further hydrolysis leads to trimethyl-silicium-acetylene.

The preparation of 1.8 dichloro-octadiine 1.7 from 1.4 dibromobutane is another example of the use of metal-halogeno-acetylides as intermediates in substitution reactions.

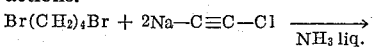

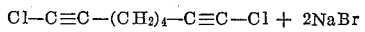

The 1.8 dichloro-octadiine 1.7 so obtained is a liquid of boiling point 98–100° C. under 16 mm. of Hg, the structure of which is confirmed by analysis and infra-red spectroscopy.

More generally, the new acetylides of this invention can be used in organic synthesis as intermediates for reactions of substitution with mono-, di- or poly-halogeno substituted alkyls or aryls to obtain the corresponding halogeno acetylenic substituted alkyls or aryls.

These new acetylides can also be used in exchange reactions, for example reacted with an organic compound having an activated hydrogen atom, such as malonic ester

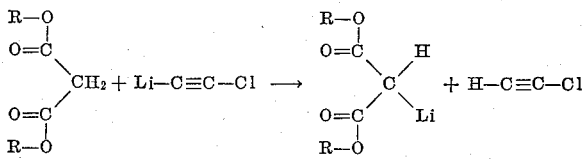

The organo-lithium intermediate can either be submitted to hydrolysis to remove the metal atom or be reacted with a reactive organic halide; the previous exchange reaction is also a very convenient way of generating an acetylenic compound, i.e. monohalogeno acetylene, in very high yield.

Furthermore, these new compounds can be used as blocking groups whereby the terminal halogen atom prevents an undesirable reaction from taking place on the acetylenic chain. This blocking effect is of value when competitive reactions between two or more groups are encountered and the terminal halogen can be removed after the desired reaction has taken place. For example, in a compound such as

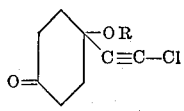

the terminal chlorine atom attached to the acetylenic chain shifts the reactivity of a Grignard agent to the ketonic group. The chlorine atom can then be removed by reduction or exchange with phenyl lithium and hydrolysis, for example. In the latter instance, a new acetylide is formed in situ which can be used to repeat the reaction or extend the acetylenic chain.

It should be noticed that if the terminal halogen hinders electrophilic reactions in comparison of that one of a free acetylenic compound, it acts on the contrary as activating element for nucleophilic addition to the triple bond. For instance, addition of water in the presence of acids, to a chloro acetylenic chain attached to any organic group leads to a

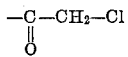

chain whereas the addition of bases leads to a

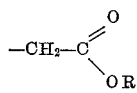

chain. For example, a chloroacetylenic side chain attached to a side chain, such as

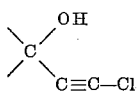

can be used for extension into an α-chloroketol group,

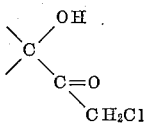

which is useful in sugar and cortisone chemistry, or it can be extended into an acetyl group,

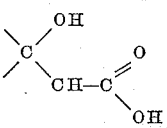

according to the type of addition. In the latter case, the step of fixing an acetylenic chain through a metal-chloroacetylide is much easier than by the presently known use of an ethoxyacetylenic intermediate. By hydrogenation, the said chloroacetylenic chain will lead to a chlorovinyl group.

The following examples are illustrative:

EXAMPLE I

*Lithium-chloroacetylide from an organo-lithium*

Forty milliliters of a 1.0 N ethereal solution of phenyl-lithium is placed in a three-necked bottle of 250 milliliters capacity and air is removed from the solution by bubbling nitrogen through it for 0.5 hour. Ten milliliters of a 38 percent ethereal solution of dichloro-acetylene is added to the phenyl-lithium from a separatory funnel and an exothermic reaction is immediately initiated and a gentle ebullition begins. This is maintained by reflux and stirring for 0.5 hour. At the end of this period, an infrared analysis of the solution shows that lithium chloroacetylide is present by the 0.3μ shift of the C≡C adsorption. Upon isolating a small amount of the lithium chloroacetylide, it was found that the compound was extremely unstable in the solid, dry state. Therefore, the material was handled in ether solution. Thereafter, 3.9 grams of cyclohexanone dissolved in 50 milliliters of ether are progressively added to the reaction mixture. This mixture is heated under reflux for 0.5 hour and then cooled below −50° C. and ammonium chloride added to decompose the alcoholate formed. The ethereal phase is then washed with water and dilute acid and dried over sodium sulfate. Ether is eliminated by distillation and the residue is distilled under a reduced pressure of 22 millimeters of mercury. The first fraction, collected up to 105° C., consists of chloro-benzene and nonreacted cyclohexanone. The second fraction, collected between 105° C. and 107° C. consists of 1,1-chloroethyne cyclohexanol. Based on the quantity of 1,1-chloroethyne cyclohexanol formed, the yield of the intermediate lithium-chloroacetylide was about 97 percent of theoretical. The reaction product is then recrystallized in petroleum ether and is identical to that one described by Strauss and Kollek in Ber. 63 (1930), page 1883.

EXAMPLE II

*Lithium-chloroacetylide from an organo-lithium*

In a manner similar to that employed in Example I, 121 milliliters of an 0.1 M ethereal solution of n butyl lithium is reacted with 25 milliliters of an 4.3 M ethereal solution of dichloro-acetylene, at −50° C. At the end of this period, an infrared analysis of the solution shows that lithium chloroacetylide, is present by the 0.3μ shift of the C≡C adsorption. Upon isolating a small amount of the lithium chloroacetylide, it was found that the compound was extremely unstable in the solid state. Thereafter, 10 grams of cyclohexanone dissolved in 12 milliliters of ether are added progressively at room temperature and the mixture kept thereat for 1.5 hours. Ethereal phase is distilled off using a spinning band distillation column. The first fraction, collected at 78° C. consists of n butyl chloride as expected, with a refraction index $n_D^{22} = 1.4004$.

The second fraction, collected up to 95° C. consists of a small quantity of unreacted cyclohexanone and of water.

The third fraction, collected between 98 and 104° C. under a pressure of 16 millimeters of mercury consists of 1,1-chloroethyne-cyclohexanol. The yield of the intermediate lithium-chloroacetylide based on the cyclohexanone derivative is about 93 percent of theoretical. Recrystallization of the final reaction product leads to a compound identical to that one described in Example I. An equivalent exchange reaction is obtained starting from vinyllithium and dichloroacetylene leading to the 1,1-chloroethyne cyclohexanol through the intermediate lithium chloroacetylide.

EXAMPLE III

Sodium-chloroacetylide from sodium amide

Into a three-necked bottle in a cooling bath, 11.6 grams of sodium metal are dissolved in 250 milliliters of liquid ammonia. The preparation of the corresponding amide is achieved by the method taught by T. H. Vaughn, R. R. Vogt, and J. A. Nieuwland in J.A.C.S. (1934), page 2120, using $Fe(NO_3)$ as a catalyst. The mixture is cooled to −60° C. (this cooling may be eliminated without detrimental effect) and 24.5 grams of dichloroethylene dissolved in 50 milliliters of ether is progressively added. The mixture is stirred and refluxed for 1 hour, using a Dry Ice condenser to produce sodium-chloroacetylide at the end of this period, a small quantity of sodium-chloroacetylide is isolated and its structure proven by its infrared-spectrum (Na—C≡C—Cl at 1986/cm.∼5.03μ). Hydrolysis led to free monochloroacetylene and NaCl. To the above solution 24 grams of cyclohexanone dissolved in 50 milliliters of ether was added. The reaction mixture is allowed to evaporate overnight and the 1,1-chloroethyne-cyclohexanol is obtained by the procedure given in Example I. The yield of 1,1-chloroethyne-cyclohexanol is about 86 percent.

EXAMPLE IV

Lithium-chloro-acetylide from lithium amide

The steps of Example III are repeated except that 3.5 grams of lithium metal are used instead of the sodium metal and the reaction mixture is allowed to evaporate for only 1.25 hours. The yield of 1,1-chloroethyne cyclohexanol is about 72 percent.

The properties of the Li—C≡C—Cl corresponded in a parallel experiment where a small quantity was isolated with those described under Example I and analogous to Example III.

EXAMPLE V

Calcium-chloro-acetylide from calcium amide

The steps of Example III are repeated except that 10 grams of calcium are used instead of the sodium metal. The yield of 1,1-chloroethyne-cyclohexanol is about 50 percent.

EXAMPLE VI

Sodium-fluoro-acetylide from sodium amide

The steps of Example III are repeated except that 0.24 gram of sodium metal and 20 milliliters of liquid ammonia are first used for the preparation of the corresponding sodium amide. The mixture is cooled at −60° C. and 0.6 gram of cis-bromo-fluoro ethylene (B. Pt. 40° C.) dissolved in 10 milliliters of ether is progressively added. The mixture is stirred and refluxed for ½ hour, using a Dry Ice condenser. The cooling bath is then removed and $NH_3$ is allowed to evaporate. One adds then 3 milliliters of paraffinic oil dissolved in 15 milliliters of ether and the excess of solvent is evaporated at room temperature and reduced pressure, using a water vacuum pump to facilitate the operation. The residue consists of a dark grey product which is identified as sodium fluoro acetylide by infra-red spectroscopy, showing the triple-bond stretching frequency at 4.58μ.

Comparable results are obtained when trans-bromo-fluoro-ethylene is used as starting material.

EXAMPLE VII

Lithium-fluoro-acetylide from lithium amide

The steps of Example VI are repeated except that 0.17 gram of lithium metal and 65 milliliters of liquid ammonia are first used, and that 1.5 grams of cis-bromo-fluoro-ethylene dissolved in 20 milliliters of ether, were then added to the lithium amide formed, yielding the desired lithium-fluoro-acetylide. No attempts were made to isolate it due to the extremely high explosive character of this compound.

EXAMPLE VIII

Sodium bromoacetylide from sodium amide

The steps of Example III are repeated except that 23 grams of sodium metal and 500 milliliters of liquid ammonia are first used for the preparation of the corresponding sodium amide. To this mixture, cooled down at −60° C., one adds progressively 93 grams of dibromoethylene dissolved in 50 milliliters of ether. The mixture is then processed as described in Example III except that 49 grams of cyclohexanone, dissolved in 50 milliliters of ether plus an excess of 250 milliliters of ether are added.

The first fraction, collected up to 50° C. under 0.7 millimeter Hg consists of unreacted cyclohexanone. The second fraction, collected at 120° under 0.7 millimeter of Hg, consists of free acetylenic carbinol. The third fraction, collected at 150° C. under 0.7 millimeter of Hg, consists of bromoacetylene carbinol, the adsorption of the bromoacetylenic band of which is identified at ∼4.5μ by infra-red spectroscopy.

Although the invention has been illustrated by the preceding examples, it is not to be construed as limited to the materials employed therein, but rather, the invention encompasses the generic area as hereinbefore disclosed. Various modifications and embodiments of this invention can be made without departing from the spirit and scope thereof.

What is claimed is:

1. A process for the preparation of metal-halogeno-acetylides, which comprises reacting an organo-lithium compound selected from the group consisting of alkyl, alkenyl, and aryl-mono lithium, with a di-halogeno-acetylene, in which the halogen thereof is selected from the group consisting of chlorine, bromine and fluorine, in an organic solvent which is non-reactive with reactants and reaction products, at a temperature at which the organic solvent is in the liquid state.

2. A process for the preparation of metal-halogeno-acetylides, which comprises the steps of removing substantially all air from a solution of an organo-lithium compound selected from the group consisting of alkyl, alkenyl, and aryl-mono-lithium, and having an organic solvent which is nonreactive with reactants and reaction products, and adding to said solution a di-halogeno-acetylene in which the halogen thereof is selected from the group consisting of chlorine, bromine, and fluorine, at a temperature at which the organic solvent is in the liquid state.

3. A process for the preparation of metal-halogeno-acetylides, which comprises the steps of removing substantially all air from a solution of an organo-lithium compound selected from the group consisting of alkyl, alkenyl, and aryl-mono-lithium, and having an organic solvent which is nonreactive with reactants and reaction products, and adding to said solution a di-halogeno-acetylene in which the halogen thereof is selected from the group consisting of chlorine, bromine, and fluorine, at a temperature at which the organic solvent is in the liquid state, and stirring and refluxing the material so formed until the metal-halogeno-acetylide is formed.

4. A process according to claim 3 in which the di-halogeno-acetylene is di-chloro-acetylene.

5. A process for the preparation of metal-halogeno-acetylides, which comprises reacting stoichiometric amounts of an amide of a metal selected from the group consisting of an alkali metal of Group I and an alkaline earth metal of Group II of the Periodic Table, with a di-halogeno-ethylene compound in which the halogen thereof is selected from the group consisting of chlorine, bromine, and fluorine, in liquid ammonia in the absence of moisture and at a temperature such as will maintain the ammonia in the liquid state.

6. A process for the preparation of metal-halogeno-acetylides, which comprises mixing stoichiometric amounts of an amide of a metal selected from the group consisting of an alkali metal of Group I and an alkaline earth metal of Group II of the Periodic Table, with a di-halogeno-ethylene compound in which the halogen thereof is selected from the group consisting of chlorine, bromine, and fluorine, in liquid ammonia in the absence of moisture, and at a temperature of from about −80° C. to about −30° C.

7. A process for the preparation of metal-halogeno-acetylides, which comprises mixing stoichiometric amounts of an amide of a metal selected from the group consisting of an alkali metal of Group I and an alkaline earth metal of Group II of the Periodic Table, with a di-halogeno-ethylene compound in which the halogen thereof is selected from the group consisting of chlorine, bromine, and fluorine, in liquid ammonia in the absence of moisture, and at a temperature of from about −80° C. to about −30° C.; and stirring and refluxing the mixture so formed until the metal-halogeno-acetylide is formed.

8. A process for the preparation of metal-halogeno-acetylides, which comprises the steps of cooling a solution of an amide of a metal in liquid ammonia, said metal being selected from the group consisting of an alkali metal of Group I and an alkaline earth metal of Group II of the Periodic Table, to a temperature of about −60° C., adding a stoichiometric amount of a dihalogeno-ethylene compound dissolved in ether, in which the halogen thereof is selected from the group consisting of chlorine, bromine, and fluorine, to said solution containing the metal amide, and stirring and refluxing the mixture so obtained until the metal-halogeno-acetylide is formed.

9. A process according to claim 8, in which the metal amide is lithium amide.

10. A process according to claim 8, in which the metal amide is sodium amide.

11. A process according to claim 8, in which the metal amide is potassium amide.

12. A process according to claim 8, in which the metal amide is calcium amide.

13. A process according to claim 8, in which the di-halogeno-ethylene is di-chloroethylene.

14. A process according to claim 8, in which the di-halogeno-ethylene is di-bromoethylene.

15. A process according to claim 8, in which the di-halogeno-ethylene is bromo-fluoroethylene.

16. A process for the preparation of metal-halogeno-acetylides which comprises reacting a halogeno-acetylide of a first metal, in which the halogen thereof is selected from the group consisting of chlorine, bromine, and fluorine, and in which the metal is a member selected from the group consisting of lithium, sodium, potassium, rubidium, cesium, magnesium, calcium, strontium, and barium with the halide of a second metal selected from the group consisting of magnesium, calcium, strontium, barium, aluminum, silicon, arsenic, antimony, bismuth, tin, and lead, to produce the halogeno-acetylide of said second metal, said first metal having a greater affinity towards the halogen bonded to the second metal than said second metal and said process being carried out in an organic solvent non-reactive with organo-metallics and at a temperature at which the organic solvent is in the liquid state.

17. A process as claimed in claim 16, in which stoichiometric amounts of the halogeno-acetylide of the first metal and the halide of the second metal are employed.

18. A process for the addiiton of a halogeno-acetylide to an organic compound containing as a site reactive with said halogeno-acetylide, >C=O, said organic compound being selected from the class consisting of aliphatic, cycloaliphatic, polycycloaliphatic, aromatic and polycycloaromatic compounds containing up to 25 carbon atoms, and being free of groups which adversely react with said halogeno-acetylide, said process comprising contacting said organic compound with a metal-halogeno-acetylide of the formula:

$$Me(C\equiv C-X)_n$$

wherein Me stands for a metal selected from the group consisting of lithium, potassium, sodium, rubidium, cesium, magnesium, calcium, barium, and strontium; —C≡C— stands for an acetylenic group; X stands for a halogen selected from the group consisting of chlorine, fluorine, and bromine; and $n$ is equal to the valence of the metal.

19. The process of claim 18 wherein said metal halogeno-acetylide is lithium-chloroacetylide.

20. The process of claim 18 wherein said metal halogeno-acetylide is sodium-chloroacetylide.

21. The process of claim 18 wherein said metal halogeno-acetylide is potassium-chloroacetylide.

References Cited by the Examiner

UNITED STATES PATENTS 2,827,447  3/1958  Nowlin et al. _____ 260—94.9
3,020,298  2/1962  Ashby et al. _____ 260—429

OTHER REFERENCES

Beilstein's Handbuch der Organischen Chemie, 2nd Supplement to Volume 1, page 222 (1941).
Chemical Abstracts, Volume 4 (1910), page 449.
Nieuwland et al., The Chemistry of Acetylene, J.A.C.S. Monograph No. 99 (1945), Reinhold Publishing Company, pages 19, 20, and 44 relied on.
Piganiol, Acetylene Homologs and Derivatives (1950), published by Mapleton House, pages 276–277.

TOBIAS E. LEVOW, *Primary Examiner.*

E. C. BARTLETT, T. L. IAPALUCCI,
*Assistant Examiners.*